United States Patent
Oh (10) Patent No.: US 10,920,691 B1
(45) Date of Patent: Feb. 16, 2021

(54) ACTIVE PURGE SYSTEM FOR A HYBRID VEHICLE AND AN ACTIVE PURGE METHOD OF A HYBRID VEHICLE

(71) Applicants: HYUNDAI MOTOR COMPANY, Seoul (KR); KIA MOTORS CORPORATION, Seoul (KR)

(72) Inventor: Young-Kyu Oh, Gwacheon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/890,735

(22) Filed: Jun. 2, 2020

(30) Foreign Application Priority Data

Oct. 22, 2019 (KR) .................. 10-2019-0131166

(51) Int. Cl.
*F02D 41/00* (2006.01)
*F02M 25/08* (2006.01)

(52) U.S. Cl.
CPC ......... *F02D 41/004* (2013.01); *F02M 25/089* (2013.01); *F02M 25/0836* (2013.01); *F02D 2200/503* (2013.01)

(58) Field of Classification Search
CPC ............ F02D 41/004; F02D 2200/503; F02M 25/089; F02M 25/0836
See application file for complete search history.

(56) References Cited

U.S. PATENT DOCUMENTS

2016/0069303 A1* 3/2016 Pursifull ............. F02D 41/0032
   701/103
2017/0370306 A1* 12/2017 Dudar ................ F02D 41/0032

FOREIGN PATENT DOCUMENTS

KR    19980038643 A    8/1998
KR    101262605 B1    5/2013

* cited by examiner

*Primary Examiner* — Xiao En Mo
(74) *Attorney, Agent, or Firm* — Lempia Summerfield Katz LLC (57) ABSTRACT

An active purge system for a hybrid vehicle may include an active purge unit for compressing evaporation gas generated in a fuel tank and supplying the compressed evaporation gas to an intake pipe. The active purge system may further include a control unit for controlling the active purge unit, wherein the control unit controls an amount of the evaporation gas to be purged according to a state of charge of a battery.

20 Claims, 11 Drawing Sheets

ACTIVE PURGE SYSTEM FOR A HYBRID VEHICLE AND AN ACTIVE PURGE METHOD OF A HYBRID VEHICLE

CROSS-REFERENCE TO RELATED APPLICATION

This application claims priority to Korean Patent Application No. 10-2019-0131166, filed on Oct. 22, 2019, which is incorporated herein by reference in its entirety.

BACKGROUND OF THE DISCLOSURE

Field of the Disclosure

The present disclosure relates to an active purge system for a hybrid vehicle and an active purge method of the hybrid vehicle. More particularly, the present disclosure relates to an active purge system for a hybrid vehicle and an active purge method of the hybrid vehicle to control an evaporation gas treatment according to a state of charge (SOC) of a battery.

Description of Related Art

A transmission mounted electric device (TMED) system is equipped with a motor between a transmission and a clutch. The TMED system has a hybrid starter generator (HSG) connected to start an engine. An electric vehicle (EV) mode driven only by the motor is implemented according to an operation of the clutch.

The TMED system uses a battery more frequently because the EV mode is implemented during medium and low speed operation. Further, if the capacity of the mounted battery is small, the energy recovery by regenerative braking or the like is limited to exclude an occurrence of degradation due to overcharging.

In particular, in the area where the energy stored in the battery is low, the engine should also generate power for charging the battery in addition to power required for the running.

Figure 1:
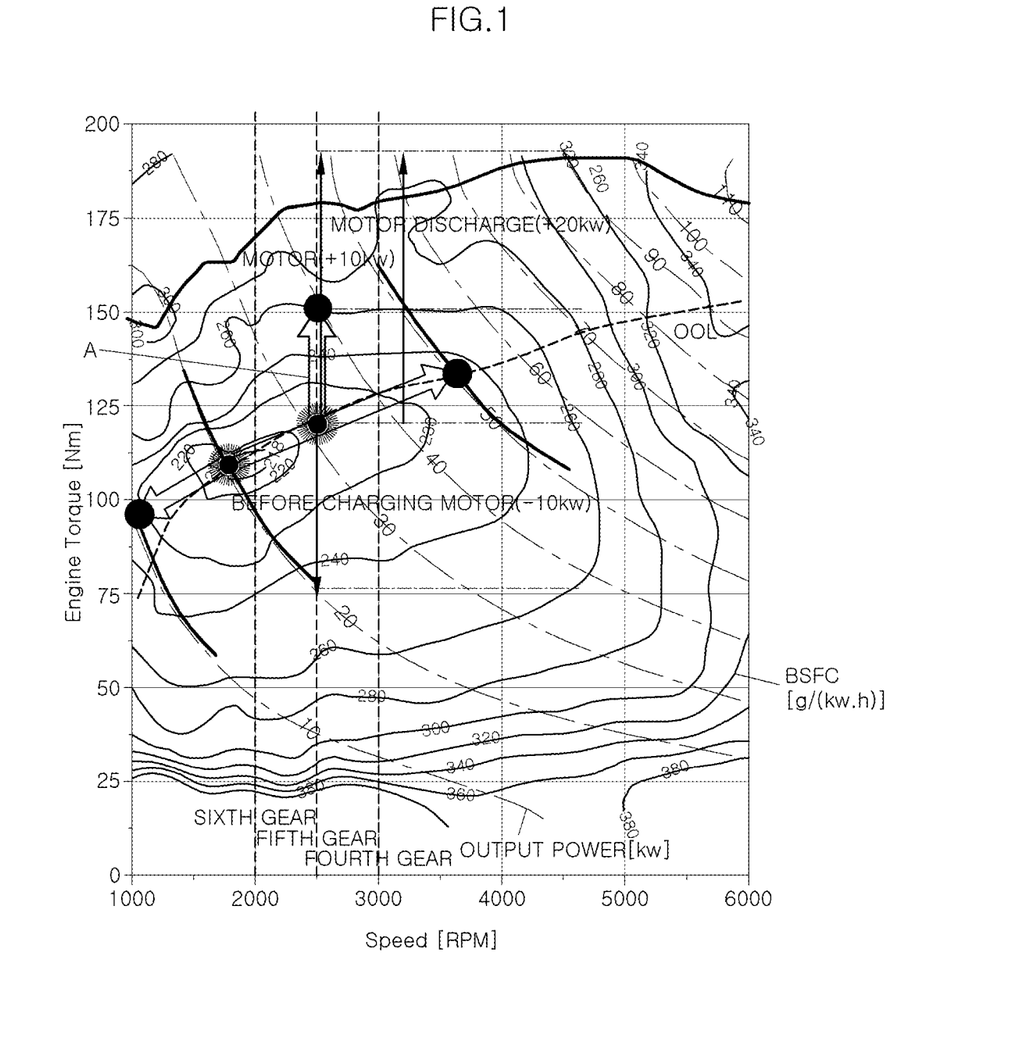
FIG. 1 is a diagram illustrating a BSFC map.

In this case, as indicated by A illustrated in FIG. 1 and represented in Table 1 below (case 2), torque is momentarily enhanced. Thus, the power for charging the battery is also generated in addition to the power required for the running.

Further, as represented in Table 1 below (case 2), even if the vehicle may be operated in an EV mode in a normal SOC, vehicle driving and battery charging should be simultaneously performed by the power output generated by the operation of the engine in a low SOC.

TABLE 1

| | Base | Case 1 | Case 2 |
|---|---|---|---|
| Running required power output | 20 kw | Upward from 20 to 50 kw | Downward from 20 to 10 kw |
| Relationship between Pe and Pm<br>Pe: a value that has converted the power by the operation of the engine into the power output [Ah: ampere hour]<br>Pm: the amount of battery consumption by the operation of the motor | Pe(+30 kw) + Pm(−10 kw) | Normal SOC:<br>Pe(+30 kw) + Pm(+20 kw)<br>Low SOC:<br>Pe(+40 kw) + Pm(+10 kw) | Normal SOC:<br>Pm(+10 kw)<br>Low SOC:<br>Pe(+30 kw) + Pm(−20 kw) |

As a result, if the SOC of the battery is low, the engine is controlled to increase the torque, such that the engine is not operated according to an optimal operation line (OOL). An operation of the engine is controlled to increase the brake specific fuel consumption (BSFC), such that energy efficiency is lowered. Meanwhile, because the engine mounted to the hybrid vehicle should be positioned in an engine room together with a HSG, a motor, and the like, the engine should be downsized. Even if the displacement of the engine is reduced, a supercharger is mounted to generate a large output.

Further, the evaporation gas is generated in a fuel tank, in which the fuel supplied to the engine has been stored. Fuel evaporates according to a change in the temperature and pressure in the fuel tank and thus the evaporation gas is generated. If the evaporation gas is continuously generated, the internal pressure of the fuel tank may be higher than necessary. If the evaporation gas is leaked from the fuel tank, it will pollute the atmosphere.

A purge system for removing the evaporation gas is mounted to the vehicle. The purge system generally includes a canister for capturing the evaporation gas and a purge control valve for connecting the canister with an intake pipe. If the supercharger is not mounted to the engine, the evaporation gas captured in the canister flows into the intake pipe by the intake pressure acting on the intake pipe if the canister and the intake pipe communicate with each other by an operation of the purge control valve.

However, if the supercharger is mounted, the internal pressure of the intake pipe may be equal to or higher than the atmospheric pressure by an operation of the supercharger. In this case, in a general purge system, there is a possibility that the evaporation gas is not moved from the canister to the intake pipe and intake air is moved from the intake pipe to the canister.

Further, if the evaporation gas is treated in a state where the operation of the engine is controlled to increase the torque as the battery SOC is low, there is a possibility that a rich combustion is generated and there is a possibility that the emission gas is momentarily increased because the evaporation gas is added to the fuel more supplied to the engine.

The contents described in Description of Related Art are to help the understanding of the background of the present disclosure and may include what is not previously known to those having ordinary skill in the art to which the present disclosure pertains.

SUMMARY OF THE DISCLOSURE

Therefore, an object of the present disclosure, considering the above, is to provide an active purge system for a hybrid vehicle and an active purge method of the hybrid vehicle. The active purge system and method may move evaporation gas from a canister to an intake pipe even during an operation of a supercharger.

Further, another object of the present disclosure is to provide an active purge system and an active purge method of the hybrid vehicle that may control the movement amount of evaporation gas from a canister to an intake pipe according to the state of charge (SOC) of a battery. Thus, an increase in emission gas caused by the evaporation gas treatment in a low SOC is prevented.

For achieving the objects, an active purge system for a hybrid vehicle according to an embodiment of the present disclosure includes an active purge unit for compressing the evaporation gas generated in a fuel tank and supplying the compressed evaporation gas to an intake pipe. The system further includes a control unit for controlling the active purge unit The control unit controls an amount of the evaporation gas to be purged according to the SOC of a battery.

Further, the active purge unit may include a purge line for connecting a canister for adsorbing the evaporation gas with the intake pipe, a purge pump mounted to the purge line, and a purge valve mounted to the purge line to be positioned between the purge pump and the intake pipe. The control unit may receive a signal from the battery and transmit an operation signal to the purge pump and the purge valve.

Further, the control unit may confirm the SOC of the battery and determine the revolutions per minute (RPM) of the purge pump and the duty of the purge valve according to the confirmed SOC of the battery.

Further, the control unit may adjust the RPM of the purge pump and the duty of the purge valve so that the evaporation gas flowing from the purge line to the intake pipe becomes a target purge flow rate.

Further, if energy stored in the battery exceeds a first predetermined value, the amount of the evaporation gas to be purged may be gradually changed whenever the level of the energy stored in the battery is changed from one state, i.e., a first state to another state, such as a second state. In the first state, the state of charge of the battery has fallen within a first band. In the second state, the state of charge of the battery has fallen within a different, second band. The first and second bands are among bands each having an arbitrary ratio of the energy with respect to the level of the maximum energy that may be stored in the battery.

Further, if the level of the energy stored in the battery is changed to fall within a band corresponding to a relatively small energy level, the amount of the evaporation gas to be purged may be changed by a relatively large amount. If the level of the energy stored in the battery is changed to fall within a band corresponding to a relatively large energy level, the amount of the evaporation gas to be purged may be changed by a relatively small amount.

Further, if the energy stored in the battery is equal to or less than a first predetermined value, the control unit may control the amount of the evaporation gas to be purged to zero.

Further, if the energy stored in the battery exceeds a second predetermined value, the evaporation gas may not be treated at the operation of the motor.

Further, if the energy stored in the battery exceeds a third predetermined value, the control unit may control the amount of the evaporation gas to be purged to zero when an engine does not operate along an optimal operation line (OOL).

For achieving the objects, an active purge method of a hybrid vehicle having the active purge system according to an embodiment of the present disclosure includes confirming the SOC of the battery. The method further includes controlling an amount of evaporation gas to be purged according to the confirmed SOC of the battery.

Further, the confirming of the SOC of the battery includes determining whether the temperatures of the coolant and oil of the engine have exceeded a predetermined temperature. The confirming of the SOC further includes determining whether the level of the energy stored in the battery falls within any band among bands each having an arbitrary ratio of the energy with respect to the level of the maximum energy that may be stored in the battery.

Further, in the controlling of the amount of the evaporation gas to be purged, the purge pump may be operated at a predetermined specific RPM The purge valve may be operated at a predetermined operation timing and duty according to the band that has been determined as the band within which the level of the energy present in the battery falls.

For achieving the objects, an active purge system for a hybrid vehicle according to an embodiment of the present disclosure includes a purge line for connecting a canister, which adsorbs the evaporation gas generated in a fuel tank, with an intake pipe. The system further includes a purge pump mounted to the purge line and a purge valve mounted to the purge line to be positioned between the purge pump and the intake pipe. The system further includes a first pressure sensor mounted to the purge line and positioned between the purge pump and the purge valve. The system further includes a second pressure sensor mounted to the purge line and positioned between the canister and the purge pump. The system further includes an engine connected with the intake pipe and a motor for generating a driving force simultaneously with the engine or for solely generating a driving force. The system further includes a battery for supplying power to the motor and a control unit for receiving signals from the battery, the first pressure sensor, and the second pressure sensor and for transmitting an operation signal to the purge pump and the purge valve.

Further, the control unit may confirm the SOC of the battery and determine the RPM of the purge pump and the duty of the purge valve according to the confirmed SOC of the battery.

Further, the control unit may adjust the RPM of the purge pump and the duty of the purge valve according to the signals received from the first pressure sensor and the second pressure sensor.

Further, the control unit may determine the RPM of the purge pump to zero if the energy stored in the battery is equal to or less than a first predetermined value.

Further, if the energy stored in the battery exceeds a first predetermined value, the control unit may gradually change the RPM of the purge pump whenever the level of the energy stored in the battery is changed from one state, i.e., a first state to another state, such as a second state. In the first state, the state of charge of the battery has fallen within a first band. In the second state, the state of charge of the battery has fallen within a different, second band. The first and second bands are among bands each having an arbitrary ratio of the energy with respect to the level of the maximum energy that may be stored in the battery.

Further, if the level of the energy stored in the battery is changed to fall within a band corresponding to a relatively small energy level, the RPM of the purge pump may be determined to be a relatively large amount. If the level of the energy stored in the battery is changed to fall within a band corresponding to a relatively large energy level, the RPM of the purge pump may be determined to be a relatively small amount.

Further, if the energy stored in the battery exceeds a second predetermined value, the RPM of the purge pump may be determined to zero at the operation of the motor.

Further, if the energy stored in the battery exceeds a third predetermined value, the control unit may determine the RPM of the purge pump to zero if the engine is not operated along an OOL.

According to the active purge system for the hybrid vehicle and the active purge method of the hybrid vehicle according to an embodiment of the present disclosure as described above, it is possible to move the evaporation gas from the canister to the intake pipe even during the operation of the supercharger.

Further, it is possible to control the movement amount of the evaporation gas from the canister to the intake pipe according to the SOC of the battery. In the low SOC, it is possible to reduce the movement amount of the evaporation gas from the canister to the intake pipe. Thus, the emission gas is reduced while rich combustion is prevented.

DESCRIPTION OF SPECIFIC EMBODIMENTS

Hereinafter, an active purge system for a hybrid vehicle and an active purge method of the hybrid vehicle according to an embodiment of the present disclosure are described with reference to the accompanying drawings.

A vehicle equipped with an active purge system for a hybrid vehicle according to an embodiment of the present disclosure is provided with an engine 600 connected to an intake pipe (I). The vehicle is further provided with a motor 700 for generating a driving force simultaneously with the engine 600 or for solely generating a driving force. The vehicle is further provided with a battery 800 for supplying power to the motor 700.

As illustrated in FIGS. 2-10, the active purge system for the hybrid vehicle according to an embodiment of the present disclosure includes an active purge unit (APU) for compressing the evaporation gas generated in a fuel tank (F) and supplying the compressed evaporation gas to the intake pipe (I). and the active purge system also includes a control unit or controller 900 for controlling the active purge unit (APU).

Figure 2:
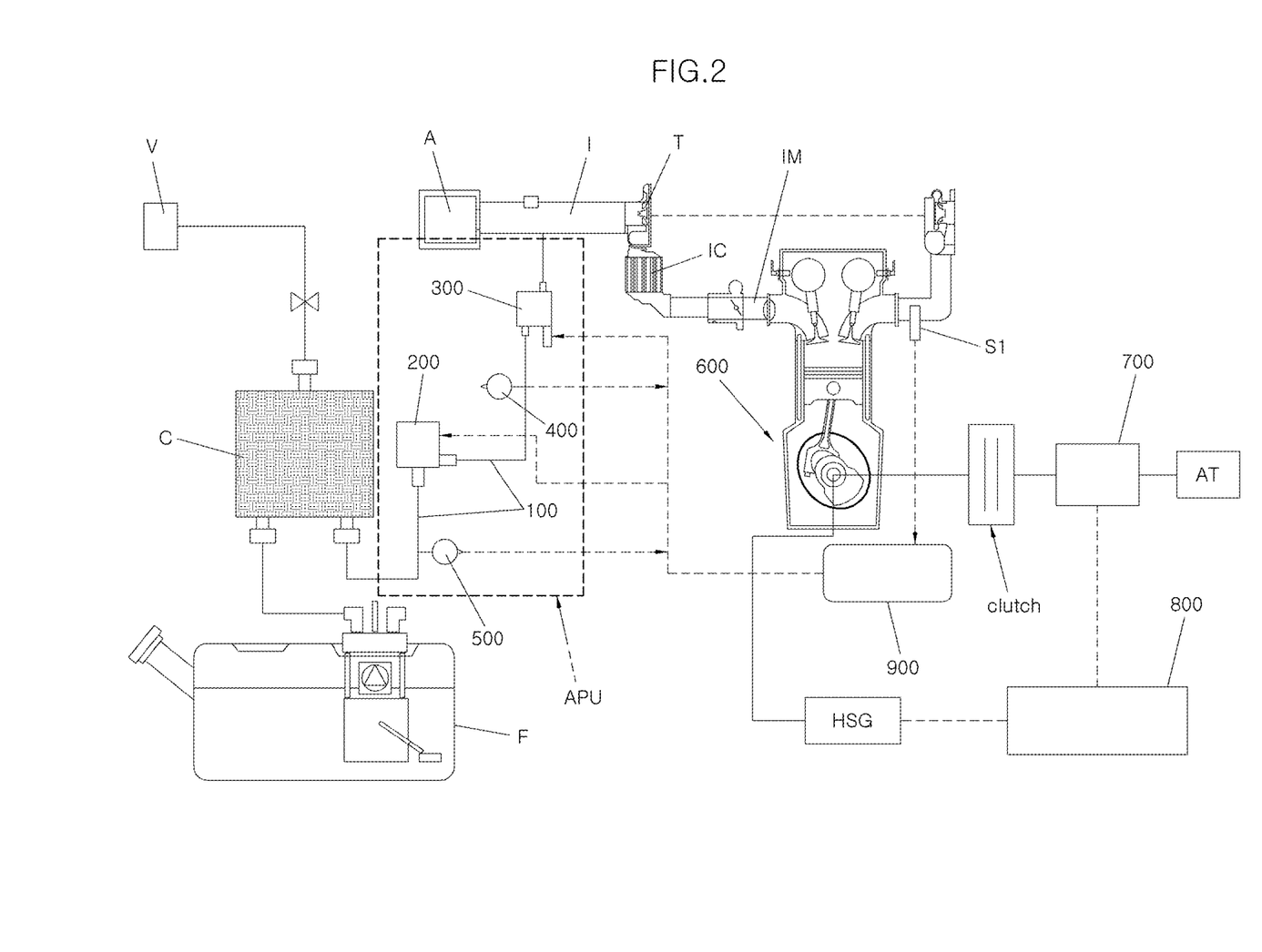
FIG. 2 is a diagram of an active purge system for a hybrid vehicle according to an embodiment of the present disclosure.

The active purge unit (APU) includes a purge line 100 connected to a canister (C) for adsorbing the evaporation gas generated in the fuel tank (F) with the intake pipe (I). The active purge unit (APU) further includes a purge pump 200 mounted to the purge line 100 and a purge valve 300 mounted to the purge line 100 and positioned between the purge pump 200 and the intake pipe (I). The active purge unit (APU) further includes a first pressure sensor 400 mounted to the purge line 100 and positioned between the purge pump 200 and the purge valve 300. The active purge unit (APU) further includes a second pressure sensor 500 mounted to the purge line 100 and positioned between the canister (C) and the purge pump 200.

The control unit 900 receives a signal from the battery 800, the first pressure sensor 400, and the second pressure sensor 500 and transmits an operation signal to the purge pump 200 and the purge valve 300.

Figure 3:
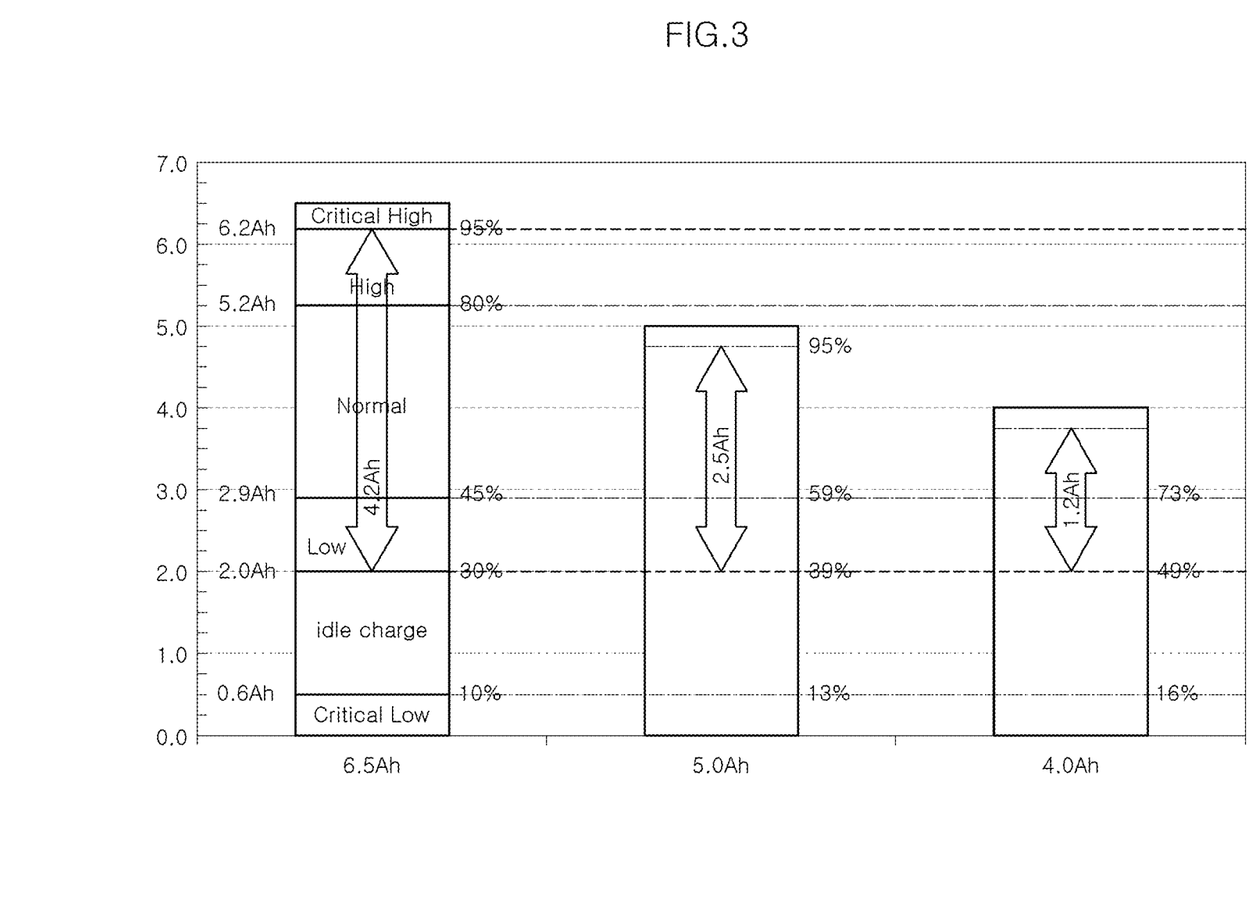
FIG. 3 is a diagram illustrating a state of charge (SOC) of a battery in FIG. 2.

The control unit 900 confirms a state of charge (SOC) of the battery 800 and determines the revolutions per minute (RPM) of the purge pump 200 according to the confirmed SOC of the battery 800. As illustrated in FIG. 3, the control unit 900 divides the SOC of the battery 800 by a band within which the level of the stored energy falls.

Figure 4:
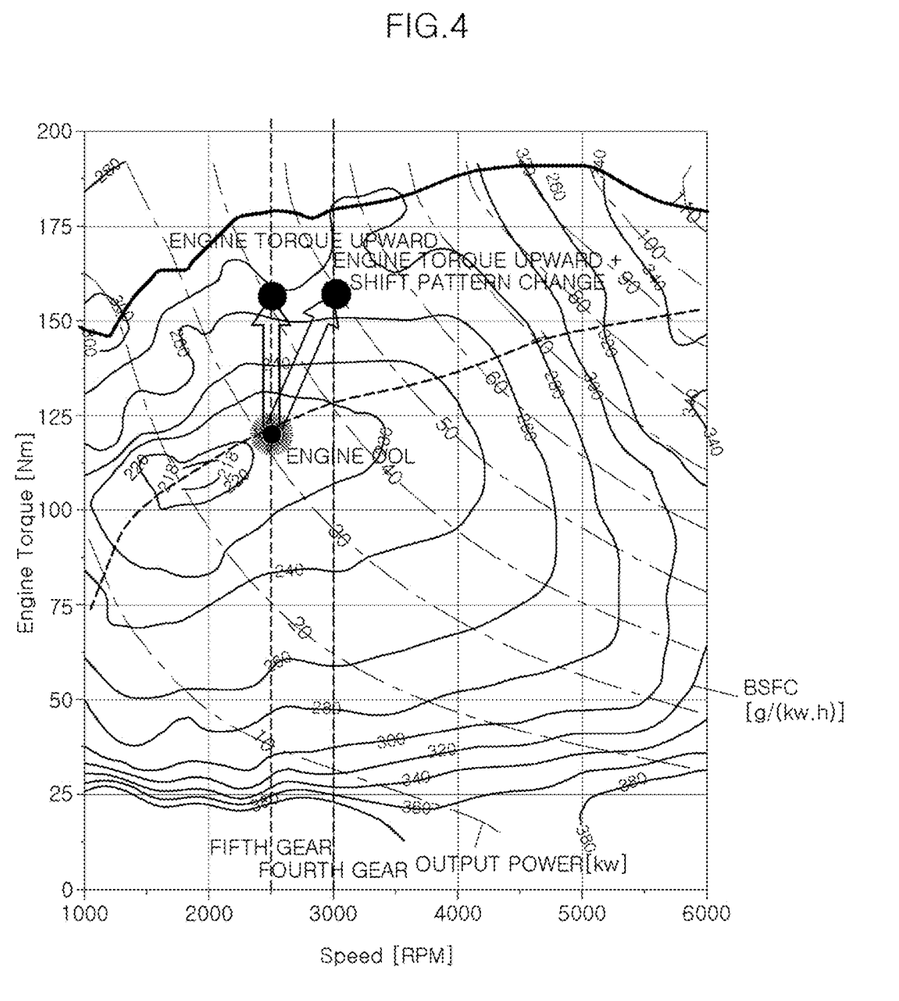
FIG. 4 is a diagram illustrating a brake-specific fuel consumption (BSFC) map for an engine control in FIG. 2.

The control unit 900 controls an operation of the engine 600 according to a brake-specific fuel consumption (BSFC) map illustrated in FIG. 4. In FIG. 4, the horizontal axis represents the RPM of the engine 600, the vertical axis represents the torque [N*m] of the engine 600, the contour line represents BSFC [g/(kW*h)], and the lines that have directionality at the origin and are diffused therefrom represent the output power [kW] lines of the engine 600. If the shift stage is a fifth gear, the control unit 900 controls the operation of the engine 600 to be closest to the fifth gear line drawn on the BSFC map. The control unit 900 may also control the transmission to shift from the fifth gear to a fourth gear to increase the RPM and increase the torque.

As illustrated in FIG. 3, the band that may divide the SOC is defined differently according to the maximum capacity of the battery 800. For example, if the maximum capacity of the battery 800 is 6.5 Ah, the band that has been determined as the normal is wider than a case where the maximum capacity of the battery 800 is 5.0 Ah or a case where the maximum capacity thereof is 4.0 Ah. Therefore, because the capacity of the battery 800 mounted to the hybrid vehicle is larger, it may be expected that the time capable of operating the engine 600 along an optimal operation line (OOL) will be increased and energy efficiency will be more excellent.

The control unit 900 determines, as a critical low band, a case where the stored energy is a first predetermined value (for example, 0.6 Ah) or less, even if the maximum capacities of the batteries 800 are different from each other. If the SOC corresponds to the critical low band, the probability that the battery 800 is completely discharged is very high. Thus, a driving by the motor 700 and an operation of an electric component are limited. The running in the electric vehicle (EV) mode is prohibited and the engine 600 operates to increase the torque for the driving and charging of the battery 800.

The control unit 900 determines, as an idle charge band, a case where the stored energy exceeds the first predetermined value (0.6 Ah) and is a second predetermined value (for example, 2.0 Ah) or less, even if the maximum capacities of the batteries 800 are different from each other. If the SOC corresponds to the idle charge band, the driving by the motor 700 is limited. The running in the EV mode is minimized. The engine 600 operates to increase the torque for the driving and charging of the battery 800.

The control unit 900 determines, as a low band, a case where the stored energy exceeds the second predetermined value (2.0 Ah) and is a third predetermined value (for example, 2.9 Ah) or less, even if the maximum capacities of the batteries 800 are different from each other. If the SOC corresponds to the low band, the driving by the motor 700 is limited. The running in the EV mode is reduced. The engine 600 operates to increase the torque for the driving and charging of the battery 800. The shift pattern of the transmission is changed to increase the torque.

The control unit 900 determines, as a normal band, a case where the stored energy exceeds 2.9 Ah and is 95% or less of the maximum capacity of the battery 800, even if the maximum capacities of the batteries 800 are different from each other. If the SOC corresponds to the normal band, the EV mode is implemented to be optimized according to the vehicle speed. The engine 600 is controlled to operate along the OOL.

The control unit 900 may also determine, as the normal band, a case where the stored energy exceeds the third predetermined value (2.9 Ah) and is 80% or less of the maximum capacity of the battery 800, if the maximum capacity of the battery 800 is 6.5 Ah or more. In this case, the control unit 900 determine, as a high band, a case where the stored energy exceeds 80% of the maximum capacity of the battery 800 and is 95% or less thereof. If the SOC corresponds to the high band, the EV mode is extensively applied regardless of the vehicle speed to prevent the battery 800 from being overcharged according to a regenerative control. The engine 600 is controlled to operate along the OOL.

The control unit 900 determines, as a critical high band, a case where the stored energy exceeds 95% of the maximum capacity of the battery 800, even if the maximum capacities of the batteries 800 are different from each other. If the SOC corresponds to the critical high band, the EV mode is extensively applied regardless of the vehicle speed and the operation of the engine 600 is controlled to reduce the torque.

Meanwhile, the active purge system for the hybrid vehicle according to an embodiment of the present disclosure treats the evaporation gas. The canister (C) is connected with the atmosphere via a line. The line is provided with a vent valve (V). The vent valve (V) selectively discharges only the air to the outside of the canister (C) or flows, i.e., directs the air from the outside of the canister (C) into the canister (C). The control unit 900 receives a signal from a lambda sensor (S1) for sensing the oxygen amount of the combustion gas. The control unit 900 derives an air-to-fuel ratio of the mixed gas combusted in a combustion chamber based on the amount of oxygen sensed by the lambda sensor (S1). The control unit 900 transmits and receives a signal with a fuel supply system for supplying fuel to the combustion chamber.

The intake pipe (I) is positioned between an air cleaner (A) and a turbocharger (T). An intercooler (IC) is provided between the turbocharger (T) and an intake manifold (IM).

The purge line 100 is provided with the purge pump 200, the purge valve 300, the first pressure sensor 400, the second pressure sensor 500, and a flowmeter sensor (not illustrated). The first pressure sensor 400 and the second pressure sensor 500 sense the pressures at the front end and the rear end of the purge pump 200 to continuously transmit the pressures to the control unit 900. The flowmeter sensor is positioned between the purge valve 300 and the intake pipe (I). The flowmeter sensor continuously senses the amount of the evaporation gas flowing from the purge line 100 to the intake pipe (I) and transmits the amount of the evaporation gas to the control unit 900.

The control unit 900 aggregates the signals received from the fuel supply system, the lambda sensor (S1), the first pressure sensor 400, the second pressure sensor 500, and the flowmeter sensor to adjust the RPM of the purge pump 200 and the duty of the purge valve 300. Thus, the evaporation gas flowing from the purge line 100 to the intake pipe (I) becomes a target purge flow rate. The fuel supply system transmits the vehicle speed, the current fuel injection amount, and the like to the control unit 900.

The target purge flow rate is a value that is induced in advance. Thus, a mixing ratio of the fuel and the intake air finally supplied to the combustion chamber may be a theoretical air-to-fuel ratio considering engine conditions (RPM, coolant temperature, and the like), a vehicle speed, and an operating state of the fuel supply system.

According to an example, the control unit 900 operates the purge pump 200 at one or more predetermined operation RPMs so that a flow rate of the evaporation gas becomes the target purge flow rate. The control unit 900 operates the purge valve 300 to perform one or more predetermined duties according to the operation RPMs of the purge pump 200. The operation RPMs of the purge pump 200 are 15000, 30000, 45000, and 60000. The duties of the purge valve 300 are 100%, 70%, 50%, and 30%.

The control unit 900 controls the operation of the purge pump 200 and the purge valve 300 based on the information sensed by various sensors to adjust the amount of the evaporation gas flowing from the purge line 100 to the intake pipe (I). Thus, a concentration or density of the evaporation gas supplied from the canister (C) to the intake pipe (I) may be adjusted.

As illustrated in FIGS. 5 to 10, the active purge system for the hybrid vehicle according to an embodiment of the present disclosure treats the evaporation gas.

Figure 5:
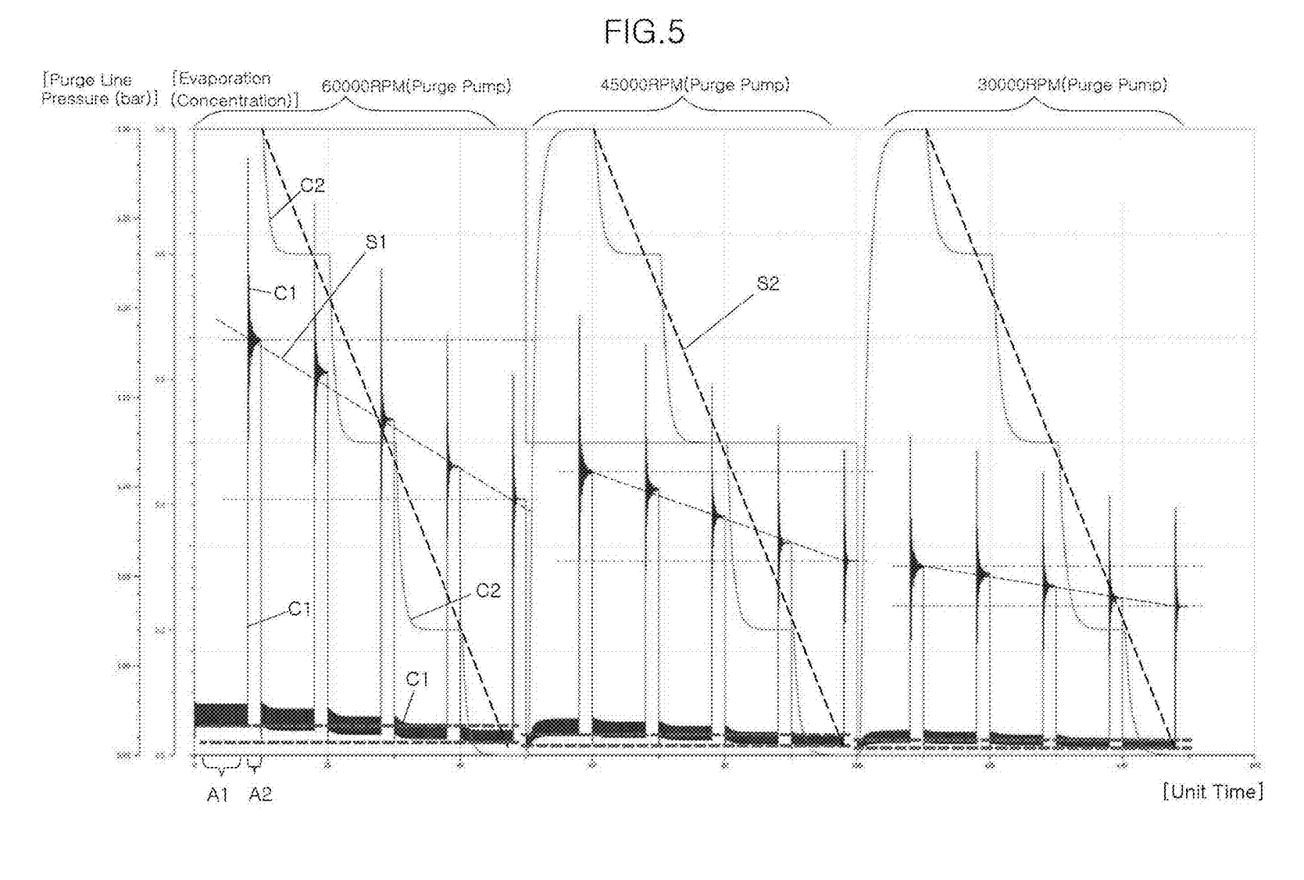
FIG. 5 is a graph illustrating a state of a purge line at an operation of a purge pump and a purge valve.

FIG. 5 has illustrated, as a graph, a pressure (C1) between the purge pump 200 and the purge valve 300 in the purge line 100 and an evaporation gas concentration (C2), in the case of maintaining the RPM of the purge pump 200 at 60000, 45000, and 30000 during a unit time and then sequentially changing it, and repeating the closing and opening of the purge valve 300 a plurality of times at equal intervals.

While the purge pump 200 maintains 60000, 45000, and 30000 RPMs, the pressure (C1) maintains a relatively low state (section A1) when the purge valve 300 is opened and maintains a relatively high state (section A2) when the purge valve 300 is closed. The evaporation gas concentration (C2) is greatly reduced if the purge valve 300 maintains the opened state and maintains its state when the purge valve 300 is closed.

When interval time of the opening and closing of the purge valve 300 is reduced, it is estimated that both the pressure (C1) and the evaporation gas concentration (C2) will be reduced linearly.

When a rotation of the purge pump 200 is maintained at a small number of RPMs, the degree of a change in the pressure (C1) according to the repetition of the opening and closing of the purge valve 300 is small (see S1). Even if the RPM of the purge pump 200 is maintained at the RPMs different from each other, the degree of the change in the evaporation gas concentration (C2) according to the opening and closing of the purge valve 300 is constant (see S2).

As a result, according to the opening and closing of the purge valve 300 while the purge pump 200 maintains the same RPM, the tendency of the change in the pressure (C1) and the evaporation gas concentration (C2) may be linearly calculated.

Therefore, according to the adjustment of the RPM of the purge pump 200 and the opening and closing operation of the purge valve 300, it is possible to supply the evaporation gas of an appropriate concentration to the intake pipe (I) at an appropriate pressure. Because the pressure of the evaporation gas supplied from the purge line 100 to the intake pipe (I) may be controlled higher than the internal pressure of the intake pipe (I), it is possible to inject the evaporation gas into the intake pipe (I) even if the supercharger is operated.

Figure 6:
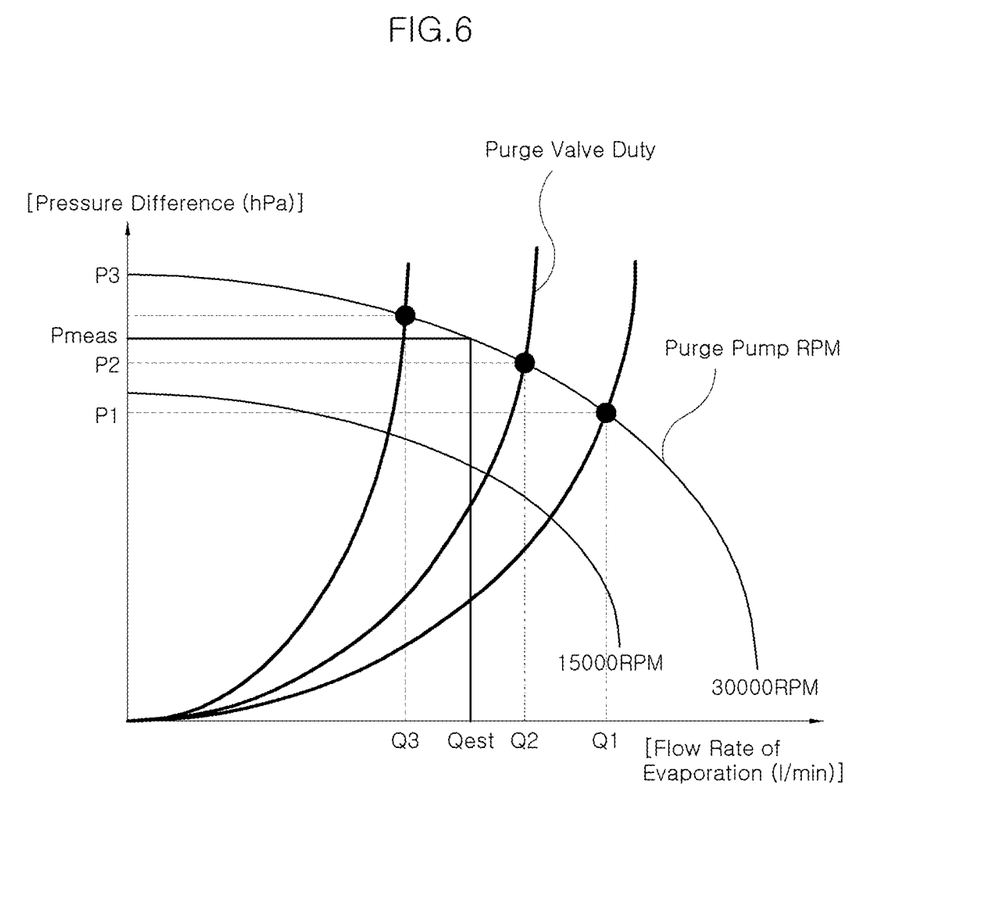
FIG. 6 is a diagram of a graph for deriving a flow rate of the evaporation gas according to an operation of the purge pump.

FIG. 6 has illustrated a characteristic graph of the purge pump 200. The x-axis represents the flow rate and the y-axis represents the pressure difference between the front and rear ends of the purge pump 200. As illustrated in FIG. 6, if the RPM of the purge pump 200, the pressure difference between the front and rear ends of the purge pump 200, and the duty of the purge valve 300 are known, the flow rate of the evaporation gas flowing from the purge line 100 to the intake pipe (I) may be derived from a prepared graph.

Figure 7:
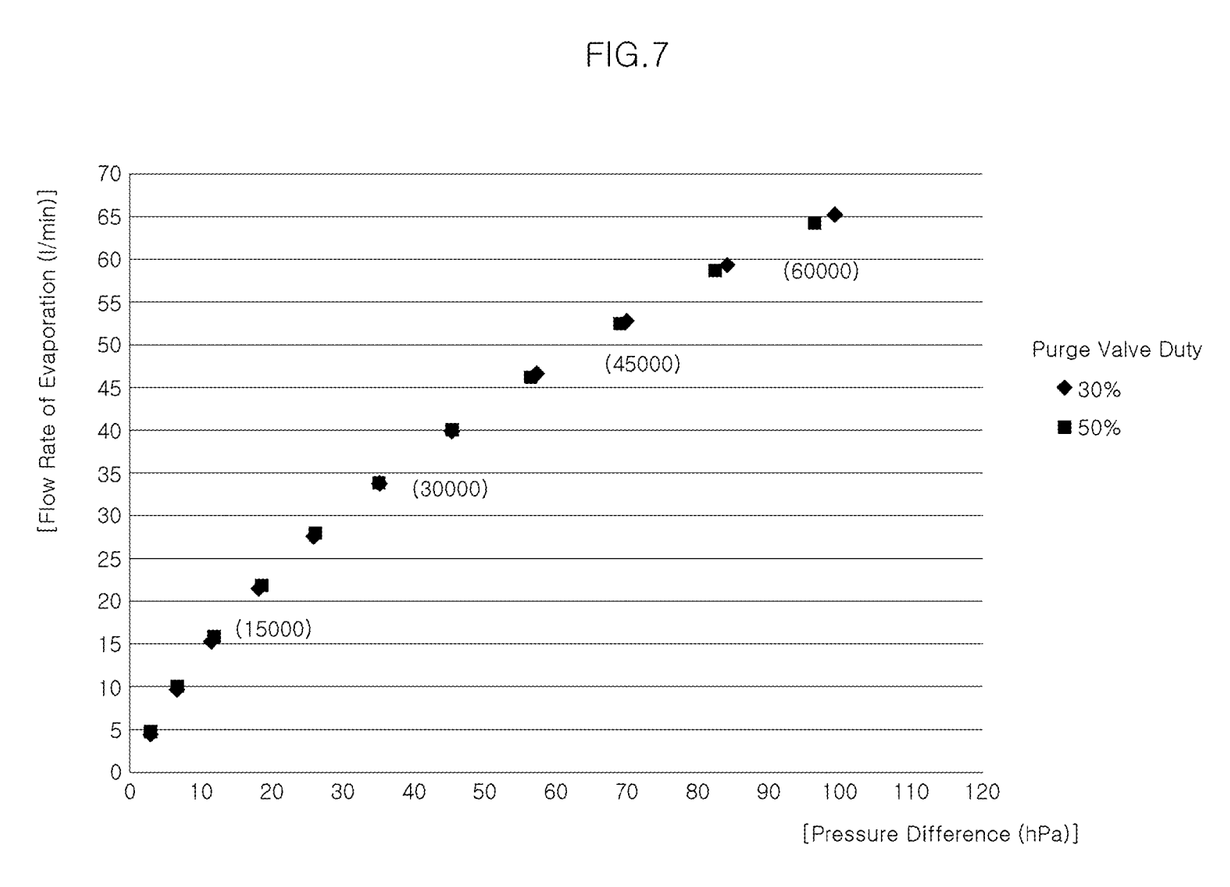
FIGS. 7-9 are graphs illustrating the flow rate of the evaporation gas according to the operation of the purge pump.
Figure 8:
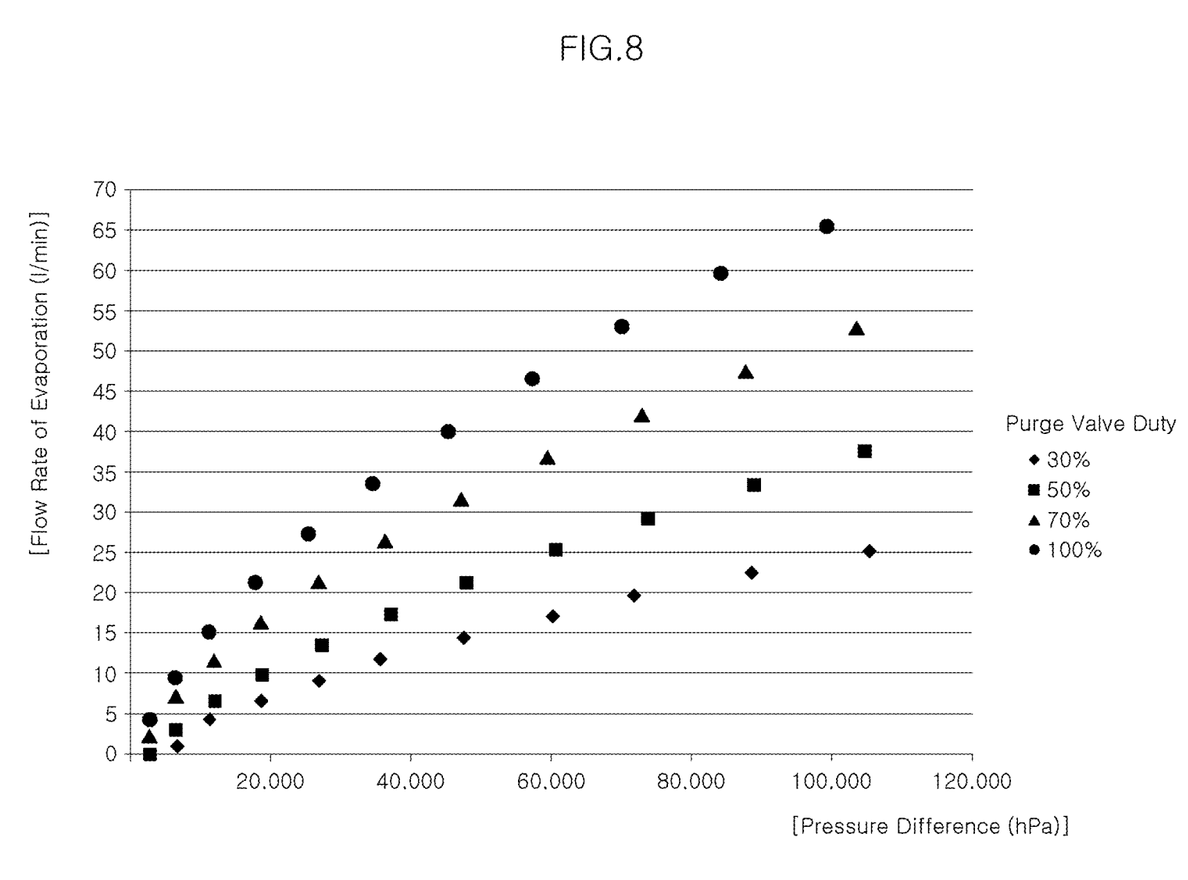
Figure 9:
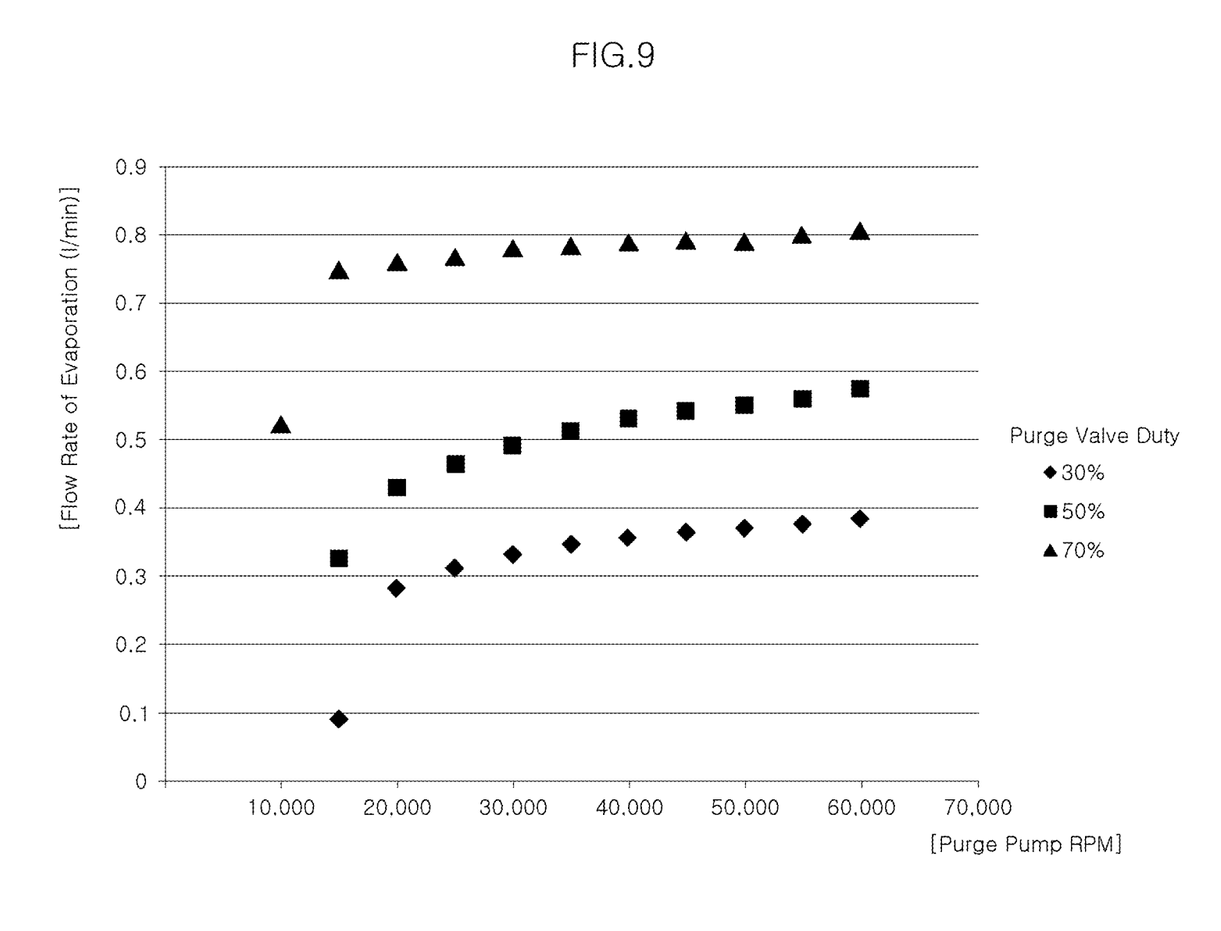

FIGS. 7 to 9 have illustrated graphs illustrating the flow rate of the evaporation gas according to the operation of the purge pump 200. In FIG. 7, the X axis represents the pressure difference between the front and rear ends of the purge pump 200 and the Y axis represents the flow rate of the evaporation gas. When the RPM of the purge pump 200 increases from 15000 to 60000 and the pressure difference between the front and rear ends of the purge pump 200 increases, the flow rate of the evaporation gas is increased. This increase may be linear.

In FIG. 8, the X axis represents the pressure difference between the front and rear ends of the purge pump 200 and the Y axis represents the flow rate of the evaporation gas. The RPM of the purge pump 200 is maintained constant and the duty of the purge valve 300 is gradually changed from 30% to 100%. When the duty of the purge valve 300 is gradually increased from 30% to 100%, the flow rate of the evaporation gas is increased compared to the pressure difference between the front and rear ends of the purge pump 200. This increase may be linear.

In FIG. 9, the X axis represents the RPM of the purge pump 200 and the Y axis represents the flow rate ratio of the evaporation gas. Relative to a case where the duty of the purge valve 300 is 100%, if the RPM of the purge pump 200 becomes an appropriate value or more, a constant flow rate ratio is maintained for each duty of the purge valve 300. Therefore, it may be seen that the flow rate of the evaporation gas may be adjusted through the adjustment of the RPM of the purge pump 200 and the adjustment of the duty of the purge valve 300.

Figure 10:
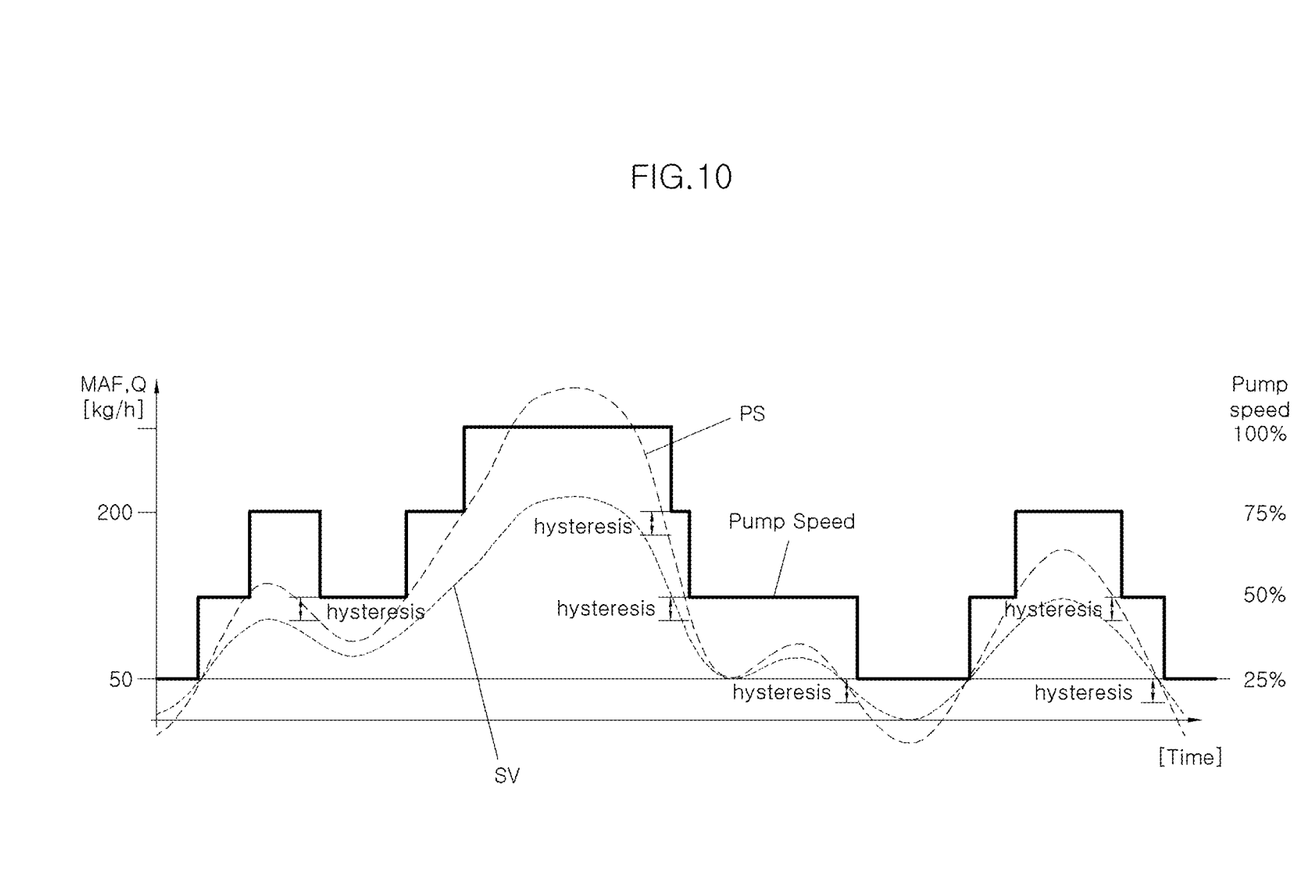
FIG. 10 is a graph illustrating the revolutions per minute (RPM) of the purge pump, the flow rate of the evaporation gas, and the duty of the purge valve.

Referring to FIG. 10, the flow rate (Q) of the evaporation gas when the RPM of the purge pump 200 is properly controlled (PS) and when the amount of the evaporation gas flowing through the purge line 100 is adjusted by the purge valve 300 (SV). The adjustment is conducted while the running of the vehicle is being changed nonlinearly. In each case, the flow rate (Q) of the evaporation gas does not coincide with each other. This may be a kind of hysteresis.

As described above, the flow rate and concentration of the evaporation gas supplied from the canister (C) to the intake pipe (I) may be adjusted. The density of the evaporation gas supplied from the canister (C) to the intake pipe (I) may also be estimated through the adjustment of the RPM of the purge pump 200 and the adjustments of opening and closing timing and duty of the purge valve 300.

Meanwhile, as described above, according to the SOC of the battery 800, the engine 600 is controlled to operate along the OOL or is controlled to generate more torque. In order to generate more torque, the amount of the fuel supplied to the combustion chamber will be increased. Therefore, according to the band to which the SOC of the battery 800 corresponds, it is preferable to adjust amount of the evaporation gas to be purged.

The active purge system for the hybrid vehicle according to an embodiment of the present disclosure controls the purge pump 200. Thus, the amount of the evaporation gas to be purged becomes zero through the control unit 900 if the energy stored in the battery 800 is equal to or less than the first predetermined value (0.6 Ah) and the SOC of the battery 800 corresponds to the critical low band. Even if the engine 600 is operated, the control unit 900 maintains the RPM of the purge pump 200 to zero and maintains the state where the purge valve 300 has been closed. Thus, the evaporation gas treatment is prohibited.

If the energy stored in the battery 800 exceeds the first predetermined value (0.6 Ah) and is equal to or less than the second predetermined value (2.0 Ah) and the SOC of the battery 800 corresponds to the idle charge band, the purge pump 200 is rotated at a first stage RPM (for example, 15000 rpm) at the operation of the engine 600. The evaporation gas is compressed between the purge pump 200 and the purge valve 300. Through the repeated opening and closing of the purge valve 300, the evaporation gas flows into the intake pipe (I) at a constant flow rate, concentration, and density.

If the energy stored in the battery 800 exceeds the second predetermined value (2.0 Ah) and is equal to or less than the third predetermined value (2.9 Ah) and the SOC of the battery 800 corresponds to the low band, the evaporation gas treatment is stopped in the EV mode. At the operation of the engine 600, the purge pump 200 is rotated at the first stage RPM to a second stage RPM (for example, 15000 to 30000 rpm). The evaporation gas is compressed between the purge pump 200 and the purge valve 300 at a higher pressure than when the SOC falls within the idle charge band. Through the repeated opening and closing of the purge valve 300, the evaporation gas flows into the intake pipe (I) at a constant flow rate, concentration, and density.

If the energy stored in the battery 800 exceeds the third predetermined value (2.9 Ah) and is equal to or less than 95% of the maximum capacity of the battery 800 and the SOC of the battery 800 corresponds to the normal band, the evaporation gas treatment is stopped in the EV mode. At the operation of the engine 600, the purge pump 200 is rotated at a third stage RPM (for example, 45000 rpm). The evaporation gas is compressed between the purge pump 200 and the purge valve 300 at a higher pressure than when the SOC falls within the low band. Through the repeated opening and closing of the purge valve 300, the evaporation gas flows into the intake pipe (I) at a constant flow rate, concentration, and density.

Meanwhile, if the maximum capacity of the battery 800 is equal to or more than a particular value (for example, 6.5 Ah), the energy stored in the battery 800 exceeds 80% of the maximum capacity of the battery 800 and is equal to or less than 95%, and the SOC of the battery 800 corresponds to the high band, the evaporation gas treatment is stopped in the EV mode. At the operation of the engine 600, the purge pump 200 is rotated at a fourth stage RPM (for example, 60000 rpm). The evaporation gas is compressed between the purge pump 200 and the purge valve 300 at a higher pressure than when the SOC falls within the normal band. Through the repeated opening and closing of the purge valve 300, the evaporation gas flows into the intake pipe (I) at a constant flow rate, concentration, and density.

Further, regardless of the maximum capacity of the battery 800, if the energy stored in the battery 800 exceeds 95% of the maximum capacity of the battery 800 and the SOC of the battery 800 corresponds to the critical high band, the evaporation gas treatment is stopped in the EV mode. At the operation of the engine 600, the purge pump 200 is rotated at the fourth stage RPM (for example, 60000 rpm) or more. The evaporation gas is compressed between the purge pump 200 and the purge valve 300 at a higher pressure than when the SOC falls within the normal band. Through the repeated opening and closing of the purge valve 300, the evaporation gas flows into the intake pipe (I) at a constant flow rate, concentration, and density.

According to an example, regardless of the band to which the SOC of the battery 800 corresponds, the opening and closing timing and the duty of the purge valve 300 are controlled in the same manner. The opening and closing timing and the duty of the purge valve 300 may be changed according to the internal pressure of the intake pipe (I), the duty of the intake valve, the target amount of the evaporation gas to be purged, the amount and concentration of the evaporation gas stored in the canister (C), and the like.

Figure 11:
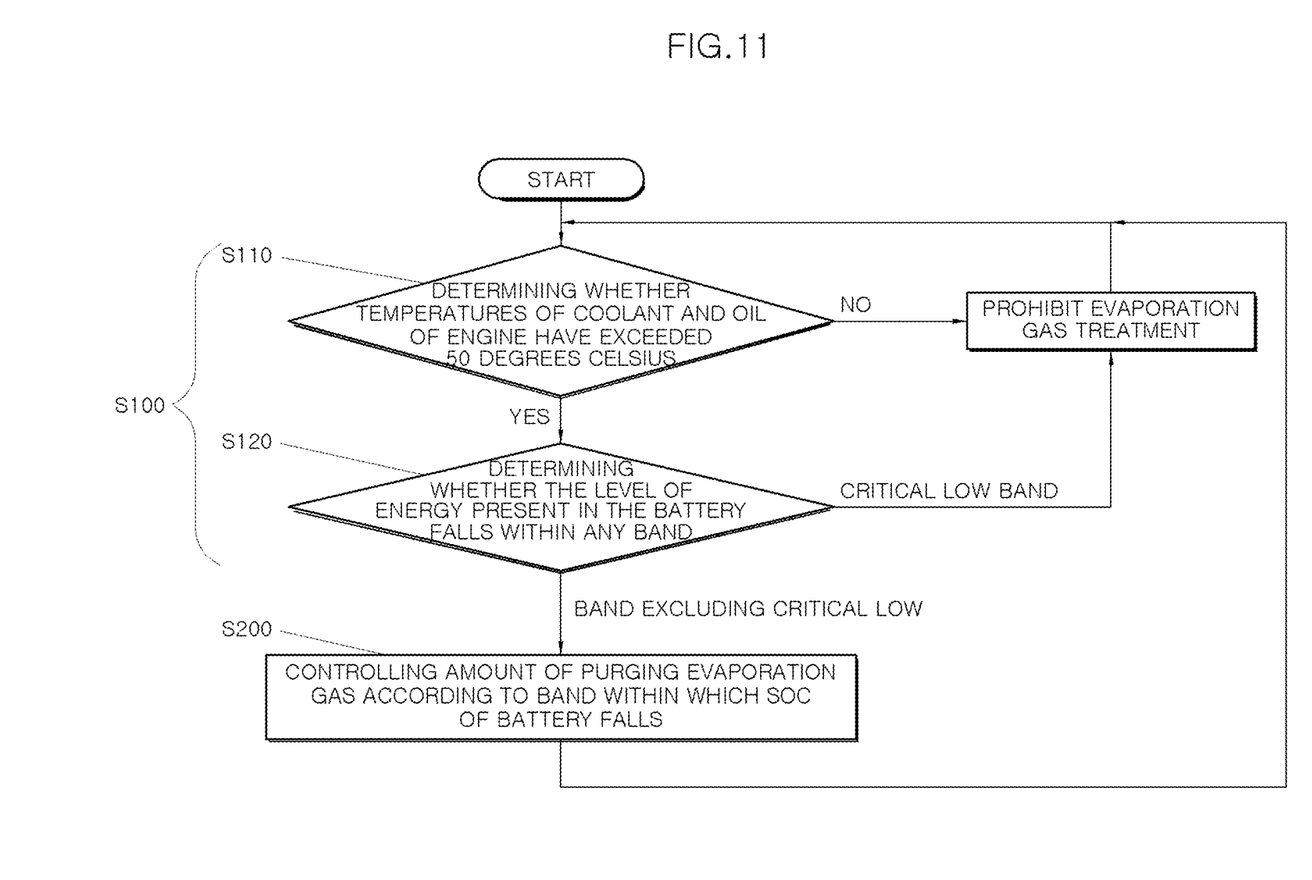
FIG. 11 is a flowchart illustrating an active purge method of the hybrid vehicle according to an embodiment of the present disclosure.

FIG. 11 has illustrated a flowchart illustrating an active purge method of a hybrid vehicle according to an embodiment of the present disclosure.

As illustrated in FIG. 11, the active purge method of the hybrid vehicle according to an embodiment of the present disclosure may include confirming the SOC of the battery 800 (S100) and controlling an amount of evaporation gas to be purged according to the confirmed SOC of the battery 800 (S200).

The confirming of the state of charge (SOC) of the battery 800 (S100) includes determining whether temperatures of coolant and oil of an engine 600 have exceeded 50 degrees Celsius (S110). The confirming of the SOC (S100) further includes determining whether the level of the energy stored in the battery 800 falls within any band among the bands each having an arbitrary ratio of the energy with respect to the level of the maximum energy that may be stored in the battery 800 (S120).

The determining of whether the temperatures of the coolant and oil of the engine 600 have exceeded 50 degrees Celsius (S110) includes determining that the engine 600 is driving in a cold state if the temperatures of the coolant and oil are equal to or lower than 50 degrees Celsius. Thus, the evaporation gas treatment is prohibited for reducing the emission gas. For example, the coolant temperature, the engine oil temperature, and the emission gas temperature are lower than appropriate values at start-up or immediately after the start-up of low temperatures of the coolant and the oil. A fuel injection amount may be relatively high for the start-up while the emission gas temperature is relatively low. Thus, a large amount of the emission gases may be emitted immediately after the start-up.

In the controlling of the amount of the evaporation gas to be purged (S200), the purge pump 200 is operated at a predetermined specific RPM according to the band that has been determined within which the level of the energy present in the battery 800 falls. The purge valve 300 is operated at a predetermined operation timing and duty.

If the energy stored in the battery 800 is determined to be equal to or less than a first predetermined value (0.6 Ah) and the SOC of the battery 800 falls within a critical low band, the RPM of the purge pump 200 is determined as zero and the evaporation gas treatment is prohibited.

If the energy stored in the battery 800 is determined to be more than the first predetermined value (0.6 Ah) and the SOC of the battery 800 does not fall within the critical low band, the RPM of the purge pump 200 is gradually changed whenever the level of the energy stored in the battery 800 is changed from one state, i.e., a first state to another state, such as a second state. In the first state, the SOC of the battery 800 has fallen within a first band and in the second state, the SOC of the battery 800 has fallen within a second band. The first and second bands are among the bands each having an arbitrary ratio of the energy with respect to the level of the maximum energy that may be stored in the battery 800.

At this time, if the level of the energy stored in the battery 800 is changed to fall within a band corresponding to a relatively small energy level, the RPM of the purge pump 200 is determined to be relatively large. If the level of the energy stored in the battery 800 is changed to fall within a band corresponding to a relatively large energy level, the RPM of the purge pump 200 is determined to be relatively small.

If the energy stored in the battery 800 is determined to be more than a second predetermined value (2 Ah) and the SOC of the battery 800 does not fall within the critical low band or an idle charge band, the RPM of the purge pump 200 is determined as zero when entering the EV mode. Thus, the evaporation gas treatment is prohibited at the running in the EV mode.

If the energy stored in the battery 800 is determined to be more than a third predetermined value (2.9 Ah) and the SOC of the battery 800 does not fall within the critical low band, the idle charge band, or a low band and the engine 600 is not operated along the OOL, the control unit 900 controls the RPM of the purge pump 200 to zero. Thus, the amount of the evaporation gas to be purged becomes zero even if the fuel injection amount is changed at an appropriate value according to the RPM and the engine 600 is operated.

According to the active purge system for the hybrid vehicle and the active purge method of the hybrid vehicle according to an embodiment of the present disclosure configured as described above, it is possible to move the evaporation gas from the canister (C) to the intake pipe (I) even during the operation of the supercharger.

Herein, an element, i.e., a device, mechanism, unit, structure, or the like may be described as having a particular purpose or performing a particular process, function, or the like. Such an element may be said to be configured to meet that particular purpose or to perform that process, function, or the like. Further, the control unit or controller described herein may include a processor programmed to perform the noted functions, determinations, and the like.

Further, it is possible to control the movement amount of the evaporation gas from the canister (C) to the intake pipe (I) according to the SOC of the battery 800. In an embodiment, it is possible to reduce the movement amount of the evaporation gas from the canister (C) to the intake pipe (I) in the low SOC. Thus, the emission gas is reduced while rich combustion is prevented.

What is claimed is:

1. An active purge system for a hybrid vehicle, the system comprising:
    an active purge unit for compressing evaporation gas generated in a fuel tank and supplying the compressed evaporation gas to an intake pipe; and
    a control unit for controlling the active purge unit,
    wherein the control unit control an amount of the evaporation gas to be purged according to a state of charge (SOC) of a battery.

2. The active purge system for the hybrid vehicle of claim 1,
    wherein the active purge unit comprises:
    a purge line connected to a canister for adsorbing the evaporation gas with the intake pipe;
    a purge pump mounted to the purge line; and
    a purge valve mounted to the purge line and positioned between the purge pump and the intake pipe, and
    wherein the control unit receives a signal from the battery and transmits an operation signal to the purge pump and the purge valve.

3. The active purge system for the hybrid vehicle of claim 2,
    wherein the control unit confirms the SOC of the battery and determines a revolutions per minute (RPM) of the purge pump and a duty of the purge valve according to the confirmed SOC of the battery.

4. The active purge system for the hybrid vehicle of claim 2,
wherein the control unit adjusts a RPM of the purge pump and a duty of the purge valve so that the evaporation gas flowing from the purge line to the intake pipe becomes a target purge flow rate.

5. The active purge system for the hybrid vehicle of claim 1,
wherein, if energy stored in the battery exceeds a first predetermined value, the amount of the evaporation gas to be purged is gradually changed whenever a level of the energy stored in the battery is changed from a first state to a second state,
wherein in the first state, the SOC of the battery has fallen within a first band,
wherein in the second state, the SOC of the battery has fallen within a different second band, and
wherein the first and second bands are among bands each having an arbitrary ratio of the energy with respect to a level of a maximum energy that may be stored in the battery.

6. The active purge system for the hybrid vehicle of claim 5,
wherein, if the level of the energy stored in the battery is changed to fall within a band corresponding to a relatively small energy level, the amount of the evaporation gas to be purged is changed to a relatively large amount, and
wherein, if the level of the energy stored in the battery is changed to fall within a band corresponding to a relatively large energy level, the amount of the evaporation gas to be purged is changed to a relatively small amount.

7. The active purge system for the hybrid vehicle of claim 1,
wherein, if energy stored in the battery is equal to or less than a first predetermined value, the control unit controls the amount of the evaporation gas to be purged to zero.

8. The active purge system for the hybrid vehicle of claim 1,
wherein, if energy stored in the battery exceeds a second predetermined value, the evaporation gas is not treated at an operation of a motor.

9. The active purge system for the hybrid vehicle of claim 1,
wherein, if energy stored in the battery exceeds a third predetermined value, the control unit controls the amount of the evaporation gas to be purged to zero when an engine does not operate along an optimal operation line (OOL).

10. An active purge method of a hybrid vehicle including the active purge system of claim 1, the method comprising:
confirming the SOC of the battery; and
controlling the amount of evaporation gas to be purged according to the confirmed SOC of the battery.

11. The active purge method of the hybrid vehicle of claim 10,
wherein the confirming of the SOC of the battery comprises:
determining whether temperatures of coolant and oil of an engine have exceeded a predetermined temperature; and
determining whether a level of energy stored in the battery falls within any band among bands each having an arbitrary ratio of the energy with respect to a level of a maximum energy that may be stored in the battery.

12. The active purge method of the hybrid vehicle of claim 11,
wherein in the controlling of the amount of the evaporation gas to be purged, the purge pump is operated at a predetermined specific RPM and the purge valve is operated at a predetermined operation timing and duty according to a band that has been determined within which the level of the energy stored in the battery falls.

13. An active purge system for a hybrid vehicle, the system comprising:
a purge line connected to a canister for adsorbing evaporation gas generated in a fuel tank with an intake pipe;
a purge pump mounted to the purge line;
a purge valve mounted to the purge line and positioned between the purge pump and the intake pipe;
a first pressure sensor mounted to the purge line and positioned between the purge pump and the purge valve;
a second pressure sensor mounted to the purge line and positioned between the canister and the purge pump;
an engine connected with the intake pipe;
a motor for generating a driving force simultaneously with the engine or for solely generating the driving force;
a battery for supplying power to the motor; and
a control unit for receiving signals from the battery, the first pressure sensor, and the second pressure sensor, and for transmitting an operation signal to the purge pump and the purge valve.

14. The active purge system for the hybrid vehicle of claim 13,
wherein the control unit confirms a state of charge (SOC) of the battery and determines a revolutions per minute (RPM) of the purge pump and a duty of the purge valve according to the confirmed SOC of the battery.

15. The active purge system for the hybrid vehicle of claim 13,
wherein the control unit adjusts an RPM of the purge pump and a duty of the purge valve according to the signals received from the first pressure sensor and the second pressure sensor.

16. The active purge system for the hybrid vehicle of claim 14,
wherein the control unit determines the RPM of the purge pump to be zero if energy stored in the battery is equal to or less than a first predetermined value.

17. The active purge system for the hybrid vehicle of claim 14,
wherein, if energy stored in the battery exceeds a first predetermined value, the control unit gradually changes the RPM of the purge pump whenever a level of the energy stored in the battery is changed from a first state to a second state,
wherein in the first state, the SOC of the battery has fallen within a first band,
wherein in the second state, the SOC of the battery has fallen within a different second band, and
wherein the first and second bands are among bands each having an arbitrary ratio of the energy with respect to a level of a maximum energy that may be stored in the battery.

18. The active purge system for the hybrid vehicle of claim 17,
wherein, if the level of the energy stored in the battery is changed to fall within a band corresponding to a relatively small energy level, the RPM of the purge pump is determined relatively large, and wherein, if the level of the energy stored in the battery is changed to fall within a band corresponding to a relatively large energy level, the RPM of the purge pump is determined relatively small.

19. The active purge system for the hybrid vehicle of claim 14,
wherein, if energy stored in the battery exceeds a second predetermined value, the RPM of the purge pump is determined to be zero at an operation of the motor.

20. The active purge system for the hybrid vehicle of claim 14,
wherein, if energy stored in the battery exceeds a third predetermined value, the control unit determines the RPM of the purge pump to zero if the engine is not operated along an optimal operation line (OOL).

* * * * *